Patented June 3, 1947

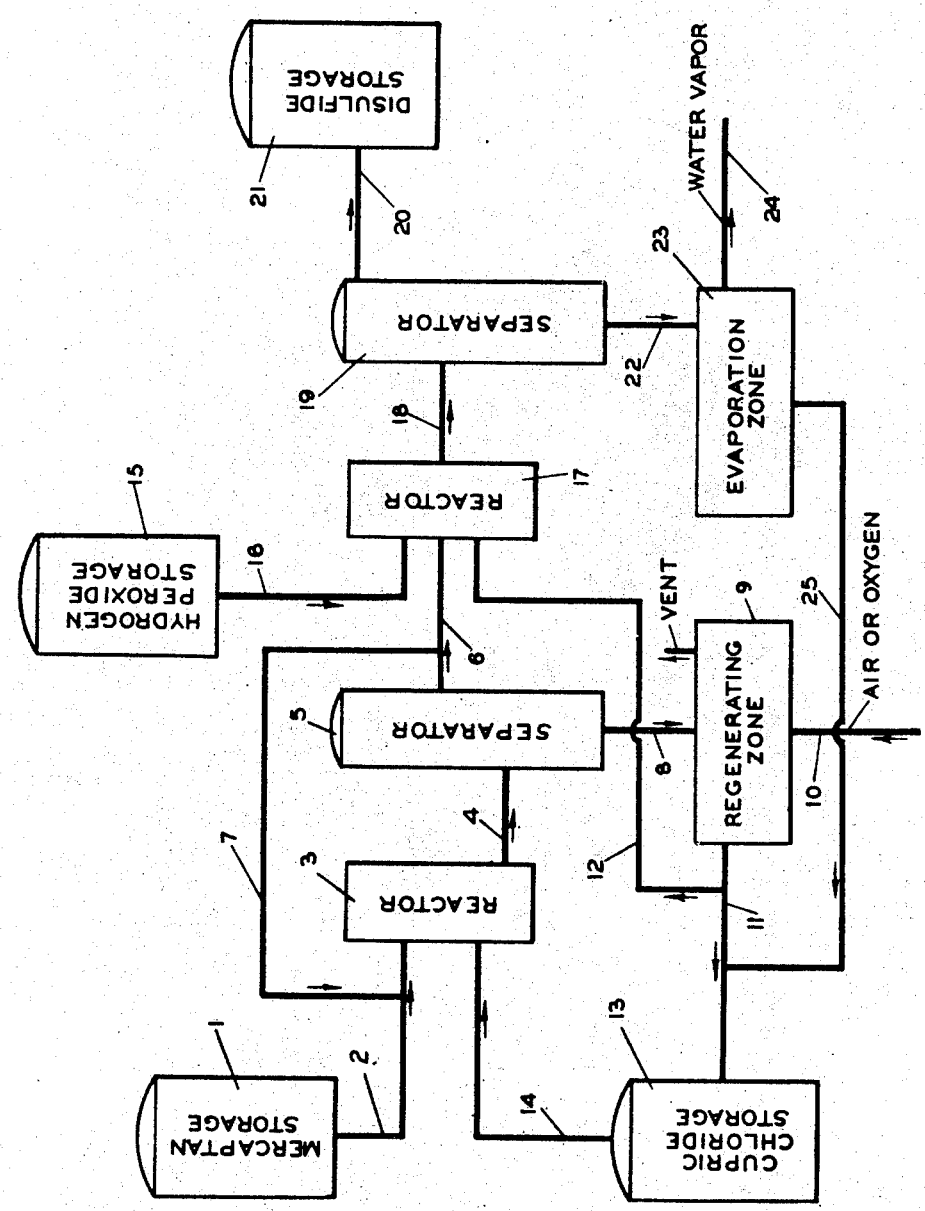

2,421,545

UNITED STATES PATENT OFFICE 2,421,545

MERCAPTAN OXIDATION PROCESS

Willie W. Crouch, Bartlesville, Okla., assignor to Phillips Petroleum Company, a corporation of Delaware Application May 13, 1944, Serial No. 535,504

10 Claims. (Cl. 260—608)

This invention relates to a novel and improved process for the conversion of mercaptans having high molecular weights to the corresponding disulfides. More specifically, the present invention relates to the oxidation of aliphatic mercaptans having high molecular weights by the novel combination of cupric chloride and hydrogen peroxide as the oxidizing agents in two separate treatments.

Mercaptans can be converted to disulfides under the influence of a variety of mild oxidizing agents. This conversion or oxidation is of special interest in the so-called sweetening of petroleum distillates. Copper halides have been widely employed as oxidizing agents in such processes. The following equations represent reactions which are postulated to take place in conventional copper-sweetening processes for converting mercaptans to disulfides:

(1) $4R\text{—}SH + 2CuCl_2 \rightarrow$
$\qquad R\text{—}S\text{—}S\text{—}R + 2R\text{—}S\text{—}Cu + 4HCl$
(2) $2R\text{—}S\text{—}Cu + 2CuCl_2 \rightarrow R\text{—}S\text{—}S\text{—}R + 4CuCl$
(3) $4CuCl + 4HCl + O_2 \rightarrow 4CuCl_2 + 2H_2O$ In the foregoing equations R represents an aliphatic hydrocarbon radical. The first equation represents the conversion of a mercaptan to a disulfide and a cuprous mercaptide and the second equation represents the conversion of the cuprous mercaptide formed in the first reaction to a disulfide. The cuprous chloride formed in the second reaction is continuously oxidized in the third reaction to the cupric form by oxygen or air dissolved in the hydrocarbon. Copper-sweetening processes thus involve very little if any consumption of chemicals other than oxygen.

In the production of disulfides having high molecular weights, that are suitable for use as lubricating-oil additives, by the oxidation of high-molecular-weight mercaptans, it has been found that conventional sweetening processes do not produce satisfactory products. When mixtures containing tertiary mercaptans having molecular weights corresponding to a molecule containing approximately ten or more carbon atoms are oxidized with cupric chloride solution, even at elevated temperatures or when present in dilute solutions in hydrocarbons, the oxidation is not completed within a reasonably short period and the product is contaminated with substantial proportions of cuprous mercaptides. It appears that the reaction expressed in Equation 2 hereinabove does not take place as readily when mercaptans having such high molecular weights or mixtures containing such mercaptans are treated as when mercaptans of low molecular weight, such as ethyl mercaptan and butyl mercaptan, are treated in accordance with conventional copper-sweetening processes that are used for the treatment of gasoline and low-boiling petroleum distillates.

An object of this invention is to provide a process for the conversion of alkyl mercaptans and mixtures of alkyl mercaptans having a molecular weight or an average molecular weight within the range of approximately 174 to approximately 258 ($C_{10}$ to $C_{16}$ mercaptans) or higher to the corresponding alkyl disulfides.

Another object of the present invention is to provide a process for the oxidation of such high-molecular-weight tertiary mercaptans or mixtures containing them to the corresponding disulfides by means of a related sequence of operations employing a combination of oxidizing agents, namely, cupric chloride solution and hydrogen peroxide solution.

An additional object of the invention is the provision of a continuous oxidation process for the conversion of high-molecular-weight mercaptans to disulfides in which a minimum consumption of chemicals is involved.

Further objects and advantages of the invention, some of which are referred to specifically hereinafter, will be apparent to those skilled in the art to which the invention pertains.

In copending application Serial No. 511,432, filed November 23, 1943, a process is described in which the inherent disadvantages of oxidation with cupric chloride are obviated by carrying out the oxidation in the presence of a solution containing both cupric chloride and hydrogen peroxide. Although neither of said oxidizing agents alone is capable of effecting the desired conversion, when used simultaneously and in combination the conversion may be effected to provide a satisfactory product. Such a treatment, however, involves a consumption of relatively large proportions of hydrogen peroxide.

I have discovered that, by the use of a novel related sequence of operations as hereinafter set forth, the consumption of hydrogen peroxide in a process such as that of said copending application application Serial No. 511,432 may be greatly reduced and at the same time substantially complete conversion of a mercaptan having a high molecular weight to a disulfide and the production of disulfides possessing satisfactory properties adapting them for use as lubricating-oil additives can be achieved. Although aqueous cupric chloride solutions alone will not effect complete oxidation of high-molecular-weight mercaptans to disulfides, a certain degree of conversion can be realized under controlled conditions while the more refractory components may be converted in a subsequent operation in the presence of hydrogen peroxide and hydrochloric or other acid. In this manner the hydrogen peroxide consumed in the reaction is reduced to substantially only that amount necessary to convert any refractory mercaptans and any unconverted cuprous mercaptides that remain after the treatment with cupric chloride. The cupric chloride which is converted in the first treatment to cuprous chloride may be regenerated to cupric chloride by oxidation with air.

In accordance with the process of the present invention, the mercaptan or mixture of mercaptans having high molecular weights is treated with a cupric chloride solution containing a high concentration of chloride ions. The chloride ions are present to maintain in solution any cuprous chloride that is formed in the treatment. The success of this first treatment depends on the maintenance of a high oxidation potential in the cupric chloride solution, which in turn is dependent on maintenance of a high ratio of cupric to cuprous ions. Therefore, in the first treatment a short contact time is provided and recirculation of the non-aqueous phase and of the regenerated cupric chloride phase are employed. The actual conversion per pass is so regulated that the cupric chloride solution is regenerated after each pass by simple aeration or treatment with oxygen. When the maximum desired conversion of mercaptan to disulfide has been reached in this treatment with cupric chloride, the effluent containing any unconverted mercaptan, cuprous mercaptide and all the disulfide is charged to a second reactor to undergo a second treatment in which it is contacted with or subjected to the action of controlled proportions of hydrogen peroxide. This second treatment is conducted in the presence of regenerated cupric chloride solution, which is used for providing hydrochloric acid, but may be conducted in its absence if sufficient hydrochloric acid is added or is present in the hydrogen peroxide or non-aqueous phase. The conversion of cuprous mercaptide in the second treatment probably takes place according to the following equation:

(4) $2R\text{—}S\text{—}Cu + 2H_2O_2 + 4HCl \rightarrow$
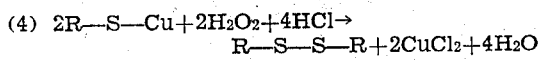
$R\text{—}S\text{—}S\text{—}R + 2CuCl_2 + 4H_2O$ The hydrochloric acid in this reaction may be furnished by the regenerated cupric chloride solution which contains an excess of this reagent by virtue of the reaction represented by Equation 1 hereinbefore.

Any mercaptan that has not been converted to a cuprous mercaptide in the first treatment or any refractory mercaptan that has not been affected by the first treatment may be converted in the second treatment to a cuprous mercaptide by the action of cupric chloride, which is formed in said treatment from the action of hydrogen peroxide on cuprous mercaptide already present in the material in accordance with Equation 4. Or the mercaptan may be converted to disulfide in the second treatment by both cupric chloride and hydrogen peroxide in conjunction, or from the hydrogen peroxide alone, perhaps in accordance with a reaction similar to that expressed in the following equation:

(5) 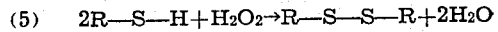

In the first treatment with cupric chloride, part or the greater portion of the mercaptan may be converted to cupric mercaptide, in accordance with Reaction 1 hereinbefore, and none or a substantial portion of the copper mercaptide thus formed may be converted to the corresponding disulfide in accordance with Reaction 2 hereinbefore. However, there may be mercaptans present in certain mixtures which are refractory or are not affected by the treatment with cupric chloride.

The conversion of these refractory mercaptans and cuprous mercaptides which are present in the effluent of the first treatment is effected in the second treatment with hydrogen peroxide. Cupric chloride is formed in this second treatment from the cuprous mercaptide, probably in accordance with the reaction expressed in Equation 4. This reaction requires hydrochloric acid, which is preferably supplied by circulation of the cupric chloride solution to the reaction mixture, although it may be supplied by other means and removed from the system by conventional methods. Cupric chloride which is present in this second treatment, which results from the conversion of cuprous mercaptides to disulfides or is present in any cupric chloride solution circulated thereto, may react in conjunction with the hydrogen peroxide to convert the refractory mercaptans directly to disulfides or to cuprous mercaptides and thence to disulfides. The amount of hydrogen peroxide which is used in the second treatment is controlled so as to effect only the desired conversion or conversions and will be dependent upon the extent to which the conversions have proceeded in the first treatment.

While the foregoing general description may be construed to be related only to batch or stepwise operation, continuous operation is also and more particularly contemplated, in which the first and second treatments proceed simultaneously or concurrently on different portions of the mixture undergoing treatment with continuous flow of cupric chloride solution from the aeration or regenerating zone to the first treatment, and with a flow of cupric chloride formed in the second treatment to the first treatment, thereby resulting in virtually no depletion in copper content nor any substantial change in oxidation potential. A flow of regenerated cupric chloride solution to the second treatment, is also contemplated for the purpose of providing the hydrochloric acid required therein.

The advantage of the process of the present invention is manifest in the reduction in the quantity of hydrogen peroxide which is used. Whereas substantially the same conversion can be accomplished in a single treatment, as described in the hereinbefore mentioned co-pending application Serial No. 511,432, hydrogen peroxide slightly in excess of the theoretical quantity for the mercaptan-disulfide conversion must be employed in order to insure the production of a product free from mercaptans and copper. By utilizing air or oxygen for the regeneration of the cupric chloride solution, as in the present process, a considerable reduction in the amount of hydrogen peroxide consumed and in processing costs is realized, since in most cases not more than 20 per cent of the quantity of hydrogen peroxide used in the process of said copending application is required.

A specific preferred embodiment of my invention is illustrated in the accompanying drawing which consists of a simplified process flow diagram. The mercaptan charge or feed, which comprises a mixture of substantially tertiary mercaptans having an average molecular weight of about 210, is withdrawn from storage tank 1 and charged to reactor 3. Simultaneously the oxidizing agent comprising aqueous cupric chloride solution is injected into the reactor from storage tank 13 via line 14. The reactor 3 may be of conventional design, the requirements being resistance to cupric ion corrosion and means for maintenance of an intimate dispersion of aqueous and non-aqueous phases. Centrifugal pumps are often employed as contactors in which case a heat exchanger (not shown) in the feed line 2 is necessary to maintain optimum reaction temperatures of approximately 100° to 175° F. If a reactor of the jet or turbo-mixer design is used, the vessel may be jacketed or provided with internal coils for purposes of temperature control.

After a suitable contact period for partial oxidation of the mercaptan, the emulsion is discharged from reactor 3 through line 4 into separator 5 where a liquid interface is maintained between the aqueous and non-aqueous phases. The partially spent cupric chloride solution is continuously withdrawn through line 8 and thence discharged into a regenerating zone 9. Air or other oxygen-rich gas is introduced into regenerating zone 9 through line 10 to convert cuprous salt to the cupric salt. The oxidizing gas is preferably presaturated with water to offset any evaporation effects which might occur during the regeneration. The regenerated solution continuously flows into line 11, from which a portion is pumped to reactor 17 through line 12, while the remainder is returned to storage tank 13. Regenerated cupric chloride solution is charged to reactor 17 rather than unregenerated solution since unregenerated solution would consume hydrogen peroxide and thereby not afford the most advantageous benefits of this process. The function of the cupric chloride solution in reactor 17 is to supply hydrochloric acid, but it may be dispensed with if acid is added instead.

The non-aqueous layer in tank 5, which comprises any unconverted mercaptan, alkyl disulfides and cuprous mercaptide, is drawn off into line 6, from which some or a substantial portion is recycled via line 7 to feed line 2 for additional treatment, while the remainder is discharged into reactor 17 for the second treatment with hydrogen peroxide. Hydrogen peroxide from tank 15 and line 16 and regenerated cupric chloride solution from line 12 are charged to the reactor 17 along with the product stream from line 6. In reactor 17, which may be similar in design to reactor 3, the cuprous mercaptides are converted to disulfides by the action of the peroxide or by the combined action of hydrogen peroxide and cupric ions, which also will convert unchanged mercaptan to the corresponding disulfide.

The effluent emulsion from reactor 17 is conducted through line 18 to separator 19, from which the alkyl disulfide product is withdrawn through line 20 to product storage tank 21. The diluted aqueous layer is discharged through line 22 into an evaporating zone 23 where excess water introduced with the hydrogen peroxide is removed through line 24. The concentrated cupric chloride solution is continuously pumped from the evaporation zone 23 by means of line 25 and line 11 to storage tank 13.

The oxidizing copper solution which is used in this process consists of an aqueous solution of cupric copper, in the presence of a chloride ion concentration equivalent to that of a 10 to 20 per cent sodium chloride solution. Sulfate ions may be present in the solution. The cupric copper concentration may vary from approximately 3 to approximately 14 per cent by weight, although intermediate concentrations of from approximately 5 to approximately 10 per cent are preferred. Cupric sulfate crystals may be used for preparing a cupric chloride solution, as described hereinafter in Example 1.

The hydrogen peroxide of the present oxidizing system may be an aqueous commercial stabilized solution having a concentration from approximately 3 to approximately 30 per cent by weight of hydrogen peroxide (10 to 100 volumes of oxygen). The more concentrated solutions containing from approximately 15 to approximately 30 per cent hydrogen peroxide are preferred. Such commercial hydrogen peroxide solutions may contain small proportions of hydrochloric acid and acetanilide or other stabilizers.

In the preferred continuous operation of the process of this invention, the volume ratio of cupric chloride solution to non-aqueous phase, the recycle to fresh feed volume ratio and the reaction or contact time are variables that are adjusted to obtain optimum performance from the cupric chloride oxidizing solution. Under the preferred operating temperatures and concentrations of cupric chloride solution, an oxidation potential within the range of approximately 415 to approximately 360 millivolts, as developed in the copper solution between a polished platinum or gold electrode and a saturated calomel half cell, is ordinarily satisfactory. The measurement of this oxidation potential is employed in establishing the operating ranges of the aforementioned variables. Since the oxidation potential increases with temperature, it is preferred to carry out both stages of oxidation at a temperature within the range of approximately 100° to approximately 150° F.

In order to maintain a high oxidation potential the contact time in the first reactor is so adjusted that over-reaction does not occur in any one pass through the reaction zone. For most efficient operation of the cupric chloride solution regenerator, not more than approximately 5 to approximately 6 per cent of the copper should be in the cuprous state. Since an increase in the cupric-cuprous ion ratio results in a decrease in oxidation potential, the contact time can be adjusted to give a conversion which does not reduce the potential substantially below 360 millivolts. Ordinarily the residence or contact time in the reactor is adjusted at a value within the range of approximately 0.5 to approximately 10 minutes, with values of from 1 to 5 minutes being preferred.

To avoid the employment of excessive volumes of cupric chloride solution, both the mercaptan and cupric chloride solution streams of the first treatment are recycled, with the latter being subjected to continuous regeneration during the external portion of the cycle. A volume ratio of aqueous to non-aqueous phase in the reactor is maintained between approximately 2 and approximately 10 or higher. Although this ratio will be largely determined by the oxidation characteristics of the feed, with most high-molecular-weight mercaptans this ratio is held between approximately 8 and approximately 10. The volume ratio of mercaptan recycle to fresh feed is usually maintained between approximately 5 and approximately 10, in order to realize maximum conversion in this stage.

In the second reactor, conditions of temperature, contact time and volume ratio of aqueous to non-aqueous phases are held at values approximately equal to those of the first reactor. Due to extensive recycling of cupric chloride solution in the first treatment, it is merely necessary to maintain the same volume ratio of non-aqueous to aqueous phase in the second stage in order to have present sufficient hydrochloric acid to effect the conversion of cuprous mercaptide to disulfide represented in Equation 4. Ordinarily no recirculation of the product stream is necessary in this step. The quantity of hydrogen peroxide will depend on the condition of the effluent from the first treatment. Quantitative chemical analytical determinations of the cuprous content and mercaptan content of the feed to the second treatment will serve to determine the quantity of hydrogen peroxide required. In the absence of results of chemical analyses, the second treatment may be operated on the assumption that maximum hydrogen peroxide consumption will be required. From the equations, maximum hydrogen peroxide is equivalent to one-half of the original mercaptan content. We have found that the addition of hydrogen peroxide, so calculated, results in an ample excess of oxidizing agent over that actually required for the production of a copper-free and substantially mercaptan-free product.

The following examples illustrate in greater detail the operation of specific embodiments of this invention. Numerous modifications will be apparent to those skilled in the art in accordance with the principles set forth herein.

*Example 1*

The oxidation of a mixture of high-molecular-weight mercaptans comprised predominantly of tertiary dodecyl mercaptans was accomplished in a two-stage batch process, involving treatment with cupric chloride solution in the first stage and hydrogen peroxide in the second stage, as follows:

The oxidizing copper solution was prepared by dissolving 190 g. of copper sulfate pentahydrate and 173 g. of sodium chloride in 920 g. of water. Approximately 480 g. of the above solution was charged to a glass reactor equipped with a stirrer. The temperature of the copper oxidizing solution was maintained at 120° F. while the liquid mercaptan was charged thereto at a rate of 60 liquid cc. per hour. During the addition of the mercaptan, the copper solution was continuously withdrawn from the reactor for aeration in a separate vessel and then returned to the reactor. The copper solution gradually faded in color due to the loss of copper to the product stream; however, no visible signs of cuprous chloride were evident.

The water-insoluble oil was separated from the copper solution and was washed with water to give a pale yellow viscous liquid which was found to be substantially free of mercaptans. Contamination of this material with cuprous mercaptide was demonstrated by shaking a small portion of the crude product oil with potassium ferrocyanide solution, whereupon a copious precipitate of cuprous ferrocyanide formed.

Approximately 50 g. of the disulfide-cuprous mercaptide product obtained in this manner from the foregoing cupric chloride oxidation was suspended in a dilute aqueous solution of hydrochloric acid by means of mechanical agitation. Ten grams of 15 per cent hydrogen peroxide solution was gradually added to the suspension while maintaining the temperature at 120° F. The clear aqueous solution rapidly developed the blue color of cupric ions. At the conclusion of the reaction, the oil layer was separated from the aqueous phase and washed with water. The absence of cuprous copper in the oil phase was established by means of the potassium ferrocyanide test while the absence of residual mercaptan was confirmed by a negative test for acid when an alcoholic solution of the oil phase was treated with silver nitrate solution.

*Example 2*

An additional 50 g. of the product from the first treatment with cupric chloride was suspended in the copper reagent recovered from the first treatment in Example 1 and the entire suspension was then treated with 15 per cent hydrogen peroxide as described in Example 1. The product from this treatment, after separation and washing with water, was also found to be free of copper and mercaptans.

Instead of treating pure mercaptans or mixtures of mercaptans, such materials may be subjected to the process of the invention in diluted form as in solution in inert solvents such as petroleum distillates, which are not miscible with water.

Although the foregoing specification refers particularly to alkyl mercaptans and disulfides, the process of the invention is adaptable generally to the treatment or conversion of mercaptans in general, particularly aliphatic mercaptans and more particularly, alkyl mercaptans, to corresponding disulfides.

Inasmuch as the foregoing specification comprises preferred embodiments of my invention, it is to be understood that it is not limited thereto, and that alterations and modifications may be made therein, in accordance with the principles described, to adapt the invention to other specific uses. The invention is not to be limited by any theories which have been proposed to account for the advantageous results obtained by the practice of the invention or to explain its operation but is to be limited only by the scope of the appended claims.

I claim:

1. In a process for the oxidation of a high molecular weight alkyl mercaptan to a disulfide by treatment with an aqueous solution of cupric chloride which yields a product that is contaminated with unoxidized mercaptans and copper compounds, the improvement which comprises subjecting said product in the presence of hydrochloric acid to the action of hydrogen peroxide in such amount and for such period that the resulting product is substantially free from unoxidized mercaptans and copper compounds.

2. In a process for the production of a disulfide by treatment of a high molecular weight alkyl mercaptan with cupric chloride and hydrogen peroxide, the improvement whereby the consumption of hydrogen peroxide is substantially reduced and the cupric chloride is regenerated, which comprises subjecting the mercaptan to the action of an aqueous solution of cupric chloride to effect partial oxidation of a substantial proportion of the mercaptan, separating the aqueous phase containing hydrochloric acid and copper salts from the non-aqueous phase, subjecting the aqueous phase to the action of an oxygen-containing gas to effect substantial regeneration of the cupric chloride therein, using said aqueous phase for further oxidation of mercaptans, and thereafter subjecting the non-aqueous phase to further treatment in the presence of hydrochloric acid with hydrogen peroxide in such amount and for such period that a product which is substantially free from unoxidized mercaptans and copper compounds is obtained.

3. A process for the production of an organic disulfide having a high molecular weight from an organic mercaptan, which comprises treating an alkyl mercaptan having a high molecular weight with an aqueous solution of cupric chloride and thereafter treating the resulting product in the presence of hydrochloric acid with hydrogen peroxide in an amount sufficient to effect substantially complete oxidation of said mercaptan.

4. A process for the production of an aliphatic disulfide having a high molecular weight from a high molecular weight alkyl mercaptan, which comprises subjecting an alkyl mercaptan to the action of a solution of cupric chloride in liquid phase, to effect partial oxidation of a substantial proportion of the mercaptan, and thereafter subjecting the resulting partially oxidized product in the presence of hydrochloric acid to the action of hydrogen peroxide in an amount sufficient to effect substantially complete oxidation and obtain a product substantially free from unoxidized mercaptans and copper compounds.

5. A process for the production of an alkyl disulfide from an alkyl mercaptan having a molecular weight in excess of approximately 174, which comprises subjecting said mercaptan to the action of an aqueous solution of cupric chloride in liquid phase until a substantial proportion of the mercaptan has been partially oxidized, and thereafter subjecting the resulting partially oxidized product in liquid phase in the presence of hydrochloric acid to the action of an aqueous solution of hydrogen peroxide in such amount that a product which is substantially free from unoxidized mercaptans and copper compounds is obtained.

6. A process as defined in claim 5 in which the treatments with the cupric chloride solution and the hydrogen peroxide solution are conducted at temperatures within the range of approximately 100° to approximately 150° F.

7. A process for the production of a mixture of alkyl disulfides from a mixture of alkyl mercaptans having an average molecular weight in excess of approximately 174, which comprises subjecting said mixture of mercaptans to the action of an aqueous solution of cupric chloride in liquid phase until a substantial proportion of the mercaptans has been partially oxidized, and thereafter subjecting the resulting product in liquid phase in the presence of hydrochloric acid to the action of an aqueous solution of hydrogen peroxide in such amount and for such period that a product which is substantially free from unoxidized mercaptans and copper compounds is obtained.

8. A process for the production of an alkyl disulfide having a high molecular weight from an alkyl mercaptan, which comprises in a first treatment subjecting an alkyl mercaptan having a molecular weight within the range of approximately 174 to approximately 258, to the action of an aqueous solution of cupric chloride for a period sufficient to effect partial oxidation of a substantial proportion of the mercaptan, separating the aqueous phase containing hydrochloric acid and copper salts from the non-aqueous phase, subjecting the aqueous phase to treatment with an oxygen-containing gas to regenerate cupric chloride, subjecting said non-aqueous phase in the presence of a portion of the regenerated cupric chloride solution containing hydrochloric acid in a second treatment to the action of hydrogen peroxide in such amount and for such period that a product which is substantially free from unoxidized mercaptans and copper compounds is obtained, separating the product of the second treatment from the aqueous phase containing cupric chloride and subsequently using said aqueous phase together with the regenerated aqueous phase of the first treatment for conversion of further quantities of mercaptans.

9. A continuous process for the production of a mixture of alkyl disulfides having a high average molecular weight from a mixture of alkyl mercaptans, which comprises in a first treatment continuously passing a mixture of alkyl mercaptans having an average molecular weight within the range of approximately 174 to approximately 258 into contact with an aqueous solution of cupric chloride for a period sufficient to effect partial oxidation of a substantial proportion of the mercaptans, continuously separating the aqueous phase containing hydrochloric acid and copper salts from the non-aqueous phase, continuously removing the aqueous phase and subjecting it to treatment with an oxygen-containing gas to regenerate cupric chloride, continuously passing said non-aqueous phase together with a stream comprising a portion of the regenerated cupric chloride solution containing hydrochloric acid in a second treatment into contact with hydrogen peroxide in such proportion and for such period that a product which is substantially free from unoxidized mercaptans and copper compounds is continuously formed, continuously separating the product of the second treatment from the aqueous phase containing cupric chloride and continuously passing said aqueous phase together with the regenerated aqueous phase of the first treatment into contact with the mixture of mercaptans being continuously subjected to the first treatment.

10. A process for converting a tertiary alkyl mercaptan of high molecular weight to a disulfide which comprises contacting said mercaptan in a first treatment with cupric chloride solution to effect a substantial conversion of said mercaptan to a disulfide and a cuprous mercaptide, separating from the effluent of said first treatment an oil phase containing said disulfide and cuprous mercaptide, separating from the effluent of said first treatment an aqueous phase consisting of a partially reduced aqueous copper solution containing hydrochloric acid and having a lower cupric copper content than the original cupric chloride solution, contacting said effluent aqueous phase with an oxygen-containing gas to effect regeneration thereof and convert cuprous copper contained therein to cupric copper, commingling said effluent oil phase from said first treatment with sufficient hydrogen peroxide and regenerated cupric chloride solution containing hydrochloric acid in a second treatment to produce a product substantially free from unconverted mercaptans and copper compounds, and to release mercaptan-bound copper, separating the product from the aqueous phase containing cupric salts, and returning said aqueous phase for further treatment of mercaptans.

WILLIE W. CROUCH.

REFERENCES CITED

The following references are of record in the file of this patent:

UNITED STATES PATENTS

| Number | Name | Date |
|---|---|---|
| 2,042,053 | Hoover | May 26, 1936 |
| 2,094,485 | Buell | Sept. 28, 1937 |
| 2,149,035 | Fuchs | Feb. 28, 1939 |
| 1,951,324 | Bosing | Mar. 13, 1934 |
| 1,840,269 | Borgstrom | Jan. 5, 1932 |

OTHER REFERENCES

Ritter et al., "J. Am. Chem. Soc.," vol. 59, pp. 12, 351, 2352, 1937.